United States Patent [19]
Colaianna et al.

[11] Patent Number: 6,066,707
[45] Date of Patent: *May 23, 2000

[54] TETRAFLUOROETHYLENE THERMOPROCESSABLE COPOLYMERS

[75] Inventors: Pasqua Colaianna, Milan; Julio A. Abusleme, Saronno, both of Italy

[73] Assignee: Ausimont S.p.A., Milan, Italy

[*] Notice: This patent issued on a continued prosecution application filed under 37 CFR 1.53(d), and is subject to the twenty year patent term provisions of 35 U.S.C. 154(a)(2).

[21] Appl. No.: 08/862,331

[22] Filed: May 23, 1997

Related U.S. Application Data

[63] Continuation of application No. 08/582,916, Jan. 4, 1996, abandoned.

[30] Foreign Application Priority Data

Jan. 4, 1995 [IT] Italy .................................. MI95A0012

[51] Int. Cl.⁷ .................................. C08E 234/02
[52] U.S. Cl. ............................................. 526/247
[58] Field of Search .............................. 526/247

[56] References Cited

U.S. PATENT DOCUMENTS

| | | |
|---|---|---|
| 2,946,763 | 7/1960 | Bro et al. . |
| 3,635,926 | 1/1972 | Gresham et al. . |
| 3,865,845 | 2/1975 | Resnick . |
| 4,029,868 | 6/1977 | Carlson . |
| 4,558,141 | 12/1985 | Squire . |
| 4,789,717 | 12/1988 | Giannetti et al. . |
| 4,827,024 | 5/1989 | Guglielmo et al. . |
| 4,864,006 | 9/1989 | Giannetti et al. . |
| 5,495,028 | 2/1996 | Navarrini et al. . |
| 5,498,682 | 3/1996 | Navarrini et al. . |
| 5,589,557 | 12/1996 | Navarrini et al. ...................... 526/247 |
| 5,597,880 | 1/1997 | Abusleme et al. ...................... 526/247 |
| 5,646,223 | 7/1997 | Navarrini et al. ...................... 526/247 |

FOREIGN PATENT DOCUMENTS

| | | |
|---|---|---|
| 0 073 087 | 8/1982 | European Pat. Off. . |
| 0 076 581 | 9/1982 | European Pat. Off. . |
| 0 080 187 | 11/1982 | European Pat. Off. . |
| 0 095 077 | 5/1983 | European Pat. Off. . |
| 0 111 343 A1 | 6/1984 | European Pat. Off. . |
| 0 460 946 | 6/1991 | European Pat. Off. . |
| 0 460 948 A2 | 12/1991 | European Pat. Off. . |
| 0 625 526 | 5/1994 | European Pat. Off. . |
| 0 633 257 | 6/1994 | European Pat. Off. . |
| 1514700 | 3/1977 | United Kingdom . |

*Primary Examiner*—Bernard Lipman
*Attorney, Agent, or Firm*—Bryan Cave LLP

[57] ABSTRACT

Tetrafluoroethylene (TFE) thermoprocessable copolymers, consisting of:

(A) from 0.1 to 15% by moles of a fluorodioxol of formula

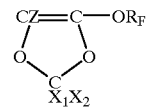

wherein $R_F$ is a perfluoroalkyl having from 1 to 5 carbon atoms; $X_1$ and $X_2$, equal to or different from each other, are —F or —$CF_3$; Z is selected from —F, —H and —Cl;

(B) from 0 to 15% by moles of a perfluorinated monomer selected from hexafluoropropene (HFP) and a perfluoralkylvinylether of formula $CF_2$=CF—O$R'_f$ wherein $R'_f$ is a perfluoroalkyl $C_2$–$C_4$ or their mixtures; excluding the value 0 for the amount of the monomer (B); and (C) TFE forming the remaining part to 100%; with the proviso that the total amount of the monomers (A) and (B) is lower than or equal to 20% by mole.

9 Claims, No Drawings

TETRAFLUOROETHYLENE THERMOPROCESSABLE COPOLYMERS

This is a continuation of U.S. application Ser. No. 08/582,916, filed Jan. 4, 1996 ABN.

The present invention relates to tetrafluoroethylene thermoprocessable copolymers. More particularly, the present invention relates to tetrafluoroethylene thermoprocessable copolymers with a fluorodioxole having improved mechanical properties, in particular at high temperatures, combined with superior optical properties.

It is known that polytetrafluoroethylene (PTFE) shows a very high melting viscosity, whereby it cannot be worked according to the techniques usually employed for thermoprocessable polymers (extrusion, molding, injection, etc.).

To obviate this drawback it is known to copolymerize tetrafluoroethylene (TFE) with hexafluoropropene (HFP) (see for instance U.S. Pat. No. 2,946,763). In order to succeed in combining acceptable mechanical properties with a melting low viscosity and therefore with good processability, it is necessary to introduce high HFP amounts, generally around 7–11% by moles. However, so high amounts of HFP cause a significant fall in the second melting temperature and consequently a clear worsening of properties at high temperature, in particular tensile and creep properties. Therefore the continuous working temperature falls from values of about 260° C. for PTFE to about 200° C. for TFE/HFP copolymers.

Other TFE thermoprocessable copolymers are those wherein TFE is copolymerized with a perfluoroalkylvinylether (PAVE), and in particular with perfluoropropylvinylether (PPVE) (see for instance U.S. Pat. No. 3,635,926). Such copolymers allow to obtain a satisfactory balance between mechanical properties and processability with PPVE amounts around 2–3% by moles.

Finally to try to obviate the drawbacks described above for the TFE/HFP copolymers, terpolymers have been suggested wherein TFE is copolymerized with 4–12% by weight of HFP and 0.5–3% by weight of PPVE (see U.S. Pat. No. 4,029,868).

Even though the employment of PPVE has substantially raised the TFE thermoprocessable copolymers properties, in particular with reference to the maximum working temperature and to the processability, thus greatly enlarging the application field, it is however felt the need from one hand to further broaden the properties range and from the other hand to make easier the conditions of the copolymers synthesis. It is indeed known that PPVE shows poor reactivity and needs complex processes of recovering of the unconverted monomer (see for instance GB patent 1,514, 700).

Fluorinated dioxols of various types are known, having general formula:

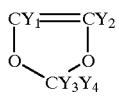

wherein $Y_1$, $Y_2$ are —H, —F or —Cl: $Y_3$, $Y_4$ are —F or —CF$_3$ (see for instance U.S. Pat. No. 3,865,845, EP 76,581, EP 80,187, EP 95,077, EP 73,087). Such compounds can be used for preparing homopolymers of copolymers with other fluorinated monomers. In particular both amorphous and crystalline copolymers are described and prepared between the above mentioned dioxols and TFE (see for isntance EP Patents 73,087, EP 95,077, U.S. Pat. No. 4,558,141).

In European patent application No. 94109782.6 in the name of the Applicant new fluorodioxols of formula:

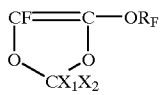

are described, wherein $R_F$ is a perfluoroalkyl having from 1 to 5 carbon atoms; $X_1$ and $X_2$, equal to or different from each other, are —F or —CF$_3$. Such dioxols can be used for preparing homopolymers and copolymers with other fluorinated monomers. In particular TFE thermoprocessable terpolymers are described wherein TFE is copolymerized with a fluorodioxol of formula (I) and with perfluoromethylvinylether. In examples 9 and 10 crystalline copolymers are moreover prepared from TFE and 2,2,4-trifluoro-5-trifluoromethoxy-1,3-dioxol, the latter being present in amounts equal to 1.1% and 3.3% by moles respectively. The copolymerization process was carried out in solution in oganic solvent (CCl$_2$FCF$_2$Cl). The copolymers thus obtained have shown a very high melting viscosity, with a Melt Flow Index value unmeasurable and therefore not thermoprocessable. No characterization was supplied as regards the optical properties of such copolymers.

The Applicant has now surprisingly found that the copolymerization of a fluorodioxol as hereinunder defined by TFE, optionally in association with HFP and/or a perfluoroalkylvinylether, for instance perfluoropropylvinylether and perfluoromethylvinylether, allows to obtain TFE thermoprocessable polymers with improved mechanical properties, in particular at high temperatures. Such properties are combined with superior optical properties, as shown by radiation transmission measurements (transmittance and haze). This combination of properties results unexpectedly higher than the one obtainable with known modifying comonomers, in particular with respect to the known fluorodioxols.

The fluorodioxols of the present invention determine, with the same amount introduced, a more marked fall of the second melting temperature surprisingly combined with a maintenance of the tensile properties and of resistance to brittle fracture at high temperatures.

Conversely, experiments carried out by the Applicant have unexpectedly shown that the fluorodioxols of the present invention have a higher modifying power than the known fluorodioxols of the prior art, and this allows to prepare copolymers having a lower content of modifying comonomer, which, the second melting temperature being equal, show superior engineering properties, in particular yield stress and improved heat creep values.

The reactivity of the fluorodioxols of the present invention is so high that there is no need of complex processes for recovering the monomer.

Subject matter of the present invention are therefore tetrafluoroethylene (TFE) thermoprocessable copolymers comprising:

(A) from 0.1 to 15%, preferably from 0.5 to 9%, by moles of a fluorodioxol of formula (I)

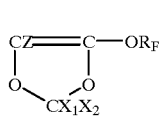

wherein $R_F$ is a perfluoroalkyl having from 1 to 5 carbon atoms; $X_1$ and $X_2$, equal to or different from each other, are —F or —CF$_3$; Z is selected from —F, —H, —Cl;

(B) from 0 to 15%, preferably from 0 to 10% by moles of a perfluorinated monomer selected from hexafluoropropene (HFP) and perfluoroalkylvinylethers of formula $CF_2=CF-OR'_f$, wherein $R'_f$ is a perfluoroalkyl $C_2-C_4$, or their blends;

(C) TFE, forming the remaining part to 100%;
with the proviso that the total amount of the monomers (a) and (b) is lower than or equal to 20% by moles, preferably lower than or equal to 12% by moles.

Preferably, in formula (I) $X_1$, $X_2$ and Z are —F, $R_f$ is preferably —$CF_3$, —$C_2F_5$, or —$C_3F_7$. Fluorodioxols of formula (I) wherein $R_f$ is —$CF_3$ or —$C_2F_5$ and $X_1$, $X_2$ and Z are —F, are particularly preferred.

Among the perfluoroalkylvinylethers of formula $CF_2=CF-OR'_f$, perfluoropropylvinylether (PPVE) is particularly preferred.

The fluorodioxols of formula (I) are described in European patent application No. 94109782.6 in the name of the Applicant, the content of which is herein incorporated by reference. In case Z is —F, they can be prepared by the following process, comprising:

(a) to react at a temperature comprised between –140° and +60° C. (preferably between 110° and –20° C.) a dioxol of formula:

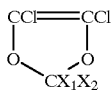
(II)

wherein $X_1$ and $X_2$ have the meaning indicated above, with a fluoroxy-compound of formula $R_fOF$, wherein $R_f$ has the meaning indicated above, thus obtaining a dioxolane of formula:

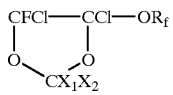
(III)

(b) to dehalogenate the dioxolane (III) according to known techniques, by reacting it with a metal in an aprotic dipolar solvent.

The dioxols of formula (II) are known compounds; they can be prepared for instance according to EP Patent application 460,946. Also fluoroxycompounds $R_f$—OF are known products. $CF_3OF$ can be prepared, for instance, according to what described by G. H. Cady and K. B. Kellogg in J. Am. Chem. Soc. 70, 3986, 1948, the higher homologues by the process described in U.S. Pat. No. 4,827,024.

An alternative process to the preceding one for preparing fluorodioxols of formula (I) wherein Z is —F, described in European patent application No. 94109782.6 as well, comprises:

(a) to react, at a temperature comprised between –140° and +60° C. (preferably between –110° and –20° C.), an olefin of formula:

$R_fO-CCl=CFCl$ (IV)

wherein $R_f$ is defined as above, with a bis-fluoroxy-compound having the formula:

$CX_1X_2(OF)_2$ (V), thus obtaining the dioxolane of formula (III);

(b) to dehalogenate the dioxolane (III) as described above.

The olefin (IV) can be obtained by reacting $CCl_2=CCl_2$ with $R_fOF$ so as to obtain the compound $R_f-OCCl_2-CFCl_2$, which, by dechlorination reaction with powdered zinc in organic solvent, supplies the olefin (IV).

A further process for preparing fluorodioxols of formula (I) when Z is —F, described in European patent application No. 94109782.6 as well, comprises reacting at a temperature comprised between 50° and 150° C. a dioxolane of formula:

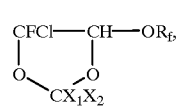
(VI)

optionally in admixture with a dioxolane of formula:

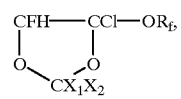
(VII)

wherein $R_f$ is defined as above, with KOH in the solid state, with consequent dehydrochlorination and formation of fluorodioxol.

The dioxolane (VI) can be obtained by reacting $R_fOF$ with trichloroethylene so as to obtain the $R_fO-CHCl-CFCl_2$ compound, which is then dechlorinated with powdered zinc in organic solution. The olefin of formula $R_f-OCH=CFCl$ is thus obtained, which is finally reacted with $CX_1X_2(OF)_2$, as described above for the olefin (IV), obtaining the dioxolane (VI).

The dioxolane (VII), in admixture with the dioxolane (VI), can be prepared as follows. The olefin $CHCl=CHCl$ is reacted with $CX_1X_2(OF)_2$, obtaining the dioxolane having the formula:

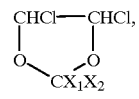
(VIII)

which, by dehydrohalogenation with solid KOH, gives the dioxol of formula:

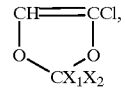
(IX)

This is at last reacted with $R_fOF$, thus obtaining a mixture of the dioxolanes (VI) and (VII).

The synthesis of fluorodioxols (I) can utilize, similarly to the processes already shown, the dichloroethylene or trichloroethylene, which are reacted with hypofluorites of formula:

$R_f$—OF and $CX_1X_2(OF)_2$, so as to obtain, by alternating reactions of dechlorination and dehydrochlorination, the various reaction intermediates described above.

Similarly to what described above for Z=—F, when Z is —Cl or —H, the fluorodioxols of formula (I) can be prepared according to the following method. 1,1-dichloroethylene CH$_2$=CCl$_2$ is reacted with hypochlorite R$_f$OCl and the reaction product is dehydrochlorinated as described above, so that the olefin of formula R$_f$—OCCl=CHCl is obtained. This last is reacted with CX$_1$X$_2$(OF)$_2$, as described above for the olefin (IV), obtaining the dioxolane having the formula:

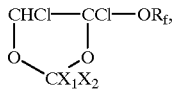
(X)

The dioxolane (X) can be dehydrochlorinated with solid KOH by supplying the fluorodioxol (I) with Z=—Cl, or it can be dechlorinated with powdered Zn in organic solvent to give the fluorodioxol (I) with X=—H.

The copolymers of the present invention show a melting viscosity such as to make them thermoprocessable according to conventional techniques, with measurable Melt Flow Index (MFI) values. In particular MFI, measured according to standard ASTM D 1238, is generally comprised between 0.5 and 50 g/10', preferably between 1 and 30 g/10'.

The copolymers of the present invention can be prepared according to known techniques, by copolymerization of the corresponding monomers, in suspension in organic medium or in aqueous emulsion, in the presence of a suitable radicalic initiator, at a temperature comprised between 0° and 150° C., preferably between 20° and 100° C. The reaction pressure is generally comprised between 0.5 and 100 bar, preferably between 5 and 40 bar.

Among the various radicalic initiators can be used in particular: inorganic peroxides soluble in water, such as for instance persulphates and ammonium or alkaline metals perphosphates, in particular ammonium or potassium persulphate; organic or inorganic redox systems, such as ammonium persulphate/sodium sulphite, hydrogen peroxide/ aminoiminomethansulphinic acid; bis-acylperoxides of formula (R$_f$—CO—O)$_2$, wherein R$_f$ is a (per)haloalkyl C$_1$–C$_{10}$, or a perfluoropolyoxyalkylenic group, such as for instance bis(perfluoropropionyl)peroxide; dialkylperoxides of formula (R$_f$—O)$_2$, wherein R$_f$ is a perhaloalkyl C$_1$–C$_{10}$, such as for instance diterbutylperoxide (DTBP); etc.

In case of copolymerization in suspension, the reaction medium is formed by an organic phase, to which water is usually added to favour the dispersion of the heat developing during the reaction. As organic phase, halogenated hydrocarbons, in particular hydrogen(chloro)fluorocarbons and chlorofluorocarbons; fluoropolyopxyalkylenes; etc., can be employed.

In case of the (co)polymerization in aqueous emulsion, the presence of a suitable surfactant is required. The most commonly used are fluorinated surfactants of formula:

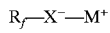

wherein R$_f$ is a (per)fluoroalkylic chain C$_5$–C$_{16}$ or a (per) fluoropolyoxyalkylenic chain, X$^-$ is —COO$^-$ or —SO$_3^-$, M$^+$ is selected from: H$^+$, NH$_4^+$, an alkaline metal ion. Among them, ammonium and/or sodium perfluoro-octanoate; (per) fluoropolyoxyyalkylene terminated with one or more carboxylic groups, etc. can be mentioned.

The process object of the present invention can be advantageously carried out in the presence of perfluoropolyoxyalkylenes emulsions or microemulsions, according to U.S. Pat. Nos. 4,789,717 and 4,864,006, or also of fluoropolyoxyalkylenes microemulsions having hydrogenated end groups and/or hydrogenated repeating units, according to EP patent application 625,526.

In order to check the molecular weight of the final product, and therefore the melting viscosity, suitable chain transfer agents are added to the reaction system, such as: hydrogen, hydrocarbons; optionally containing halogens, for instance methane, ethane, chloroform, methylenechloride, etc.; esters, ethers or aliphatic alcohols, for instance methanol, ethanol, diethylmalonate, etc. The transfer agent is sent into the reactor at the beginning of the reaction, or continuously on in discrete amounts in the course of the polymerization. The amount of the chain transfer agent utilized can range within rather wide limits, depending on the molecular weight desired, of the effectiveness of the transfer agent itself and of the reaction temperature.

Some examples of the present invention are reported hereinafter, whose purpose is merely illustrative and not limitative of the invention itself.

EXAMPLE 1

A 5 l AISI 316 steel chromated autoclave, equipped with a stirrer working at 650 rpm was evacauted and 3.0 l of demineralized water, and 2,2,4-trifluoro-5-trifluoromethoxy-1,3-dioxol (TTD), having the formula

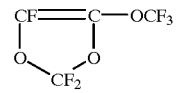

are introduced therein in amounts equal to 0.67 g/l H$_2$O. A microemulsion of perfluoropolyoxyalkylenes was then added, obtained according to Example 1 of U.S. Pat. No. 4,864,006, in such amounts as to obtain a concentration of perfluoropolyoxyalkylenic surfactant equal to 2.0 g/l H$_2$O. The autoclave was brought to the working temperature of 75° C. and then 0.24 absolute bar of ethane were loaded, acting as chain transfer agent. The autoclave was then brought to the working pression of 21 absolute bar by feeding a TFE/TTD gaseous mixture in molar ratio 54,55/1. Before beginning the reaction, the gaseous phase, analyzed by gaschromatograph, showed the following composition (% by moles): 97.9% of TFE, 2.1% of TTD. By means of a metering pump the initiatopr was then fed, consisting in a solution of potassium persulphate (KPS) having concentration equal to 0.00315 moles/l, with a flow rate of 88 ml/hour. During the reaction, the working pressure was kept constant by continuously feeding the reaction mixture TFE/TTD having the composition indicated above. The reaction was stopped after 1560 g of TFE/TTD mixture were fed. The gaseous phase present in the autoclave had at the end of the reaction the following composition (% by moles): 98.2% of TFE, 1.8% of TTD. After the reactor was cooled at room temperature, the emulsion was discharged and coagulated by addition of a 65% by weight HNO$_3$ aqueous solution. The resulting polymer was separated, washed with demineralized water and dried. The polymer was characterized as reported in Table 1.

The composition of the polymer was determined by mass balance. The second melting temperature (T$_{2m}$) was determined by scanning differential calorimetry (DSC), the Melt Flow Index according to standard ASTM D-1238-52T, with a 5 kg load.

The optical properties, that is, haze and transmittance were measured according to standard ASTM D 1003.

The mechanical properties were measured at 23° and 250° C., according to standard ASTM D 1708, with stretching rate of 50 mm/min, on samples having a thickness of 1.58±0.08 nn, compression molded according to standard ASTM D 3307-81. The reported values are the average of 3 measurements.

EXAMPLE 2

Example 1 was repeated under the same conditions, except for the amount of ethane fed before beginning the reaction, which was equal to 0.52 absolute bar. The characteristics of the obtained polymer are reported in Table 1. Creep measurements were moreover carried out thereon, according to ASTM D 2990, on samples molded by compression and pretreated at 200° C. for 48 hours, by tensile stress at 275° C. with a strength of 1.6 MPa. The results are as well reported in Table 1.

EXAMPLE 3

Example 1 was repeated under the same conditions, except for the amount of ethane fed before beginning the reaction, which was equal to 0.57 absolute bar. The characteristics of the obtained polymer are reported in Table 1.

EXAMPLE 4 (Comparative)

In the same autoclave of Example 1, 3.0 l of demineralized water and a microemulsion of perfluoropolyoxyalkylenes obtained according to Example 1 of U.S. Pat. No. 4,864,006, in such amount as to obtain a concentration of perfluoropolyoxyalkylenic surfactant equal to 2.0 g/l $H_2O$, were introduced, after evacuation. The autoclave was brought to the working temperature of 75° C. and then 0.57 absolute bar of ethane were loaded, acting as chain transfer agent. The autoclave was then brought to the working pression of 21 absolute bar by feeding a gaseous mixture between TFE and 2,2,4,5-tetra-fluoro-1,3-dioxol (PD), having the formula

with molar ratio TFE/PD equal to 54.55/1. Before beginning the reaction, the gaseous phase, analyzed by gaschromatograph, showed the following composition (% by moles): 98.2% of TFE, 1.8% of PD. By means of a metering pump the initiator was then fed, formed by a solution of potassium persulphate (KPS) having concentraion equal to 0.00315 moles/l, with a 88 ml/hour, flow. During the reaction, the working pressure was kept constant by continuously feeding the reaction mixture TFE/PD having the composition indicated above. The reaction was stopped after 780 g of TFE/PD mixture were fed. The gaseous phase at the end of the reaction had the following composition (% by moles): 99.1% of TFE, 0.9% of PD. The obtained polymer was characterized as reported in Table 1.

EXAMPLE 5 (Comparative)

In the same autoclave of Example 1, , 3.0 l of demineralized water and perfluoropropylvinylether (PPVE) in an amount equal to 3.67 g/l $H_2O$ were introduced, after evacuation. A microemulsion of perfluoropolyoxyalkylenes obtained according to Example 1 of U.S. Pat. No. 4,868,006, was then added, in such an amount to obtain a concentration of perfluoropolyoxyalkylenic surfactant equal to 2.0 g/l $H_2O$. The autoclave was brought to the working temperature of 75° C. and then loaded with 0.35 absolute bar of ethane, acting as chain transfer agent. The autoclave was then brought to the working pression of 21 absolute bar by feeding a gaseous mixture TFE/PPVE with molar ratio equal to 54,55/1. Before beginning the reaction, the gaseous phase, analyzed by gaschromatograph, showed the following composition (% by moles): 94.52% of TFE, 5.2% of PPVE. By means of a metering pump the initiatopr was then fed, consisting in a solution of potassium persulphate (KPS) having concentration equal to 0.00315 moles/l, with a flow of 88 ml/hour. During the reaction, the working pressure was kept constant by continuously feeding the reaction mixture TFE/PPVE having the composition indicated above. The reaction was stopped after 1560 g of TFE/PPVE mixture were fed. The gaseous phase at the end of the reaction had the following composition (% by moles): 94.3% of TFE, 5.7% of PPVE. After the reactor was cooled at room temperature, the emulsion was discharged and coagulated by addition of a 65% by weight aqueous solution of $HNO_3$. The polymer was characterized as reported in Table 1.

Hot creep measurements were carried out on said product as reported above. The results are as well reported in Table 1.

TABLE 1

| EXAMPLE | 1 | 2 | 3 | 4(*) | 5(*) |
|---|---|---|---|---|---|
| Polymer composition (% by mole) | TFE 98.2 TTD 1.8 | TFE 98.2 TTD 1.8 | TFE 98.2 TTD 1.8 | TFE 98.2 PD 1.8 | TFE 98.2 PPVE 1.8 |
| MFI (g/10') | 4 | 13 | 19 | 4 | 13 |
| $T_{2m}$ (° C.) | 304.5 | 305.4 | 306.0 | 306.5 | 308.3 |
| Haze | 41 | 39 | 45 | 50 | 37 |
| Transmittance | 87 | 90 | 90 | 84 | 88 |
| Mechanical properties at 23° C. | | | | | |
| Elastic modulus (MPa) | 517 | 525 | 563 | 494 | 563 |
| Yield point (MPa) | 14.8 | 15.2 | 15.4 | 13.7 | 14.7 |
| Stress at break (MPa) | 32.3 | 26.2 | 23.3 | 22.5 | 28.6 |
| Elongation at break (%) | 336 | 323 | 306 | 302 | 378 |
| Mechanical properties at 250° C. | | | | | |
| Elastic modulus (MPa) | 28 | 26 | 32 | 29 | 36 |
| Yield point (MPa) | 2.15 | 2.2 | 2.3 | 2.1 | 2.3 |
| Stress at break (MPa) | 6.4 | 5.9 | 5.1 | 3.9 | 7.5 |
| Elongation at break (%) | 334 | 369 | 308 | 255 | 539 |
| Mechanical properties at 275° C. | | | | | |
| Elastic modulus (MPa) | | 24 | 26 | | 26 |
| Yield point (MPa) | | 1.75 | 1.8 | — | 1.75 |
| Stress at break (MPa) | | 4.2 | 3.9 | | 5.2 |
| Elongation at break (%) | | 401 | 379 | | 535 |
| Creep at 275° C. and 1.3 MPa | | | | | |
| Elongation at 15 min (%) | | 5.4 | | | 5.8 |
| Elongation at 60 min (%) | — | 9.0 | — | — | 10.0 |
| Elongation at 48 hours (%) | | 21.0 | | | 25.5 |

(*)comparative

EXAMPLE 6

Example 1 was repeated under the same conditions, except for the initial amount of TTD, equal to 0.6 g/l $H_2O$, and for the molar ratio of the fed TFE/TTD mixture, equal to 61.5/1. The characteristics of the obtained polymer are reported in Table 2.

EXAMPLE 7

Example 4 was repeated under the same conditions, except for the amount of ethane fed before beginning the reaction, which was equal to 0.15 absolute bar. The characteristics of the obtained polymer are reported in Table 2.

TABLE 2

| EXAMPLE | 6 | 7(*) |
|---|---|---|
| Polymer composition | TFE 98.4 | TFE 98.2 |
| (% by mole) | TTD 1.6 | PPVE 1.8 |
| MFI (g/10') | 4 | 4 |
| $T_{2m}$ (° C.) | 308 | 308 |
| Mechanical properties at 23° C. | | |
| Elastic modulus (MPa) | 530 | 530 |
| Yield point (MPa) | 15.2 | 14.0 |
| Stress at break (MPa) | 31.9 | 31.8 |
| Elongation at break (%) | 342 | 360 |
| Mechanical properties at 250° C. | | |
| Elastic modulus (MPa) | 32 | 33 |
| Yield point (MPa) | 2.4 | 2.0 |
| Stress at break (MPa) | 8.8 | 9.8 |
| Elongation at break (%) | 342 | 535 |

(*)comparative

EXAMPLE 8

Example 1 was repeated but by using an amount of TTD of 0.427 g/l (H₂O).

The molar ratio in the feeding gaseous mixture between TFE/TTD was 60.73/1.

The amount of ethane introduced was 0.375 bar.

The characteristics of the polymer so obtained are reported in Table 3 and can be compared with the data of Example 4.

EXAMPLE 9 (Comparative)

Example 4 was repeated but with the following differences:

the molar ratio in the gaseous feeding mixtures TFE/PD was 45.95/1;

the ethane amount was 0.627 bar.

The data on the characterization of the polymer are reported in Table 3 and can be compared with Example 2.

EXAMPLE 10 (Comparative)

Example 4 was repeated but with the following differences:

the molar ratio in the gaseous feeding mixtures TFE/PD was 45.95/1;

the ethane amount was 0.64 bar.

The data on the characterization of the polymer are reported in Table 3 and can be compared with Example 3.

EXAMPLE 11

Example 1 was repeated but with the following differences: the ethane amount was 0.336 bar.

The data on the characterization of the polymer are reported in Table 3.

EXAMPLE 12 (Comparative)

Example 11 was repeated but by using PD and a molar ratio TFE/PD of 45.91/1; and the ethane amount was 0.619 bar.

The data on the characterization of the polymer are reported in Table 3 and can be compared with Example 11.

TABLE 3

| EXAMPLE | 8 | 9(*) | 10(*) | 11 | 12(*) |
|---|---|---|---|---|---|
| Polymer composition | TFE 98.38 | TFE 97.87 | TFE 97.87 | TFE 98.2 | TFE 97.87 |
| (% by mole) | TTD 1.62 | PD 2.13 | PD 2.13 | TTD 1.8 | PD 2.13 |
| MFI (g/10') | 4.3 | 11 | 17 | 8.5 | 8 |
| $T_{2m}$ (° C.) | 306.1 | 305.6 | 306.0 | 305.3 | 305.7 |
| Haze | 36 | 57 | — | 41 | 51 |
| Transmittance | 84 | 82 | — | 83 | 85 |
| Mechanical properties at 23° C. | | | | | |
| Elastic modulus (MPa) | 570 | 560 | — | 570 | 590 |
| Yield point (MPa) | 15.8 | 14.6 | — | 16 | 14.6 |
| Stress at break (MPa) | 28.9 | 15.5 | — | 29 | 18.1 |
| Elongation at break (%) | 330 | 170 | — | 344 | 250 |
| Mechanical properties at 250° C. | | | | | |
| Elastic modulus (MPa) | 34 | 39 | — | 33 | 37 |
| Yield point (MPa) | 3.9 | — | — | 3.9 | — |
| Stress at break (MPa) | 6.94 | 2.3 | — | 6.3 | 2.7 |
| Elongation at break (%) | 364 | 82 | — | 371 | 19 |
| Mechanical properties at 275° C. | | | | | |
| Elastic modulus (MPa) | | 25 | | | |
| Yield point (MPa) | — | — | — | — | — |
| Stress at break (MPa) | | 1.4 | | | |
| Elongation at break (%) | | 9 | | | |
| Creep at 275° C. and 1.3 MPa | | | | | |
| Elongation at 15 min (%) | | Immediate | A compressed | | |
| Elongation at 60 min (%) | — | break under | moulded | — | — |
| Elongation at 48 hours (%) | | stress | plaque was not possible to obtain | | |

(*)comparative

What is claimed is:

1. Tetrafluoroethylene (TFE) thermoprocessable copolymers, consisting of:
(A) from 0.1 to 15% by moles of a fluorodioxol of formula

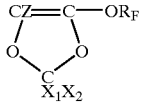

wherein $R_F$ is a perfluoroalkyl having from 1 to 5 carbon atoms; $X_1$ and $X_2$, equal to or different from each other, are —F or —$CF_3$; Z is selected from —F, —H and —Cl;
(B) from 0 to 15% by moles of a perfluorinated monomer selected from hexafluoropropene (HFP) and a perfluoralkylvinylether of formula $CF_2$=CF—OR'$_f$ wherein R'$_f$ is a perfluoroalkyl $C_2$–$C_4$ or their mixtures; and
(C) TFE forming the remaining part to 100%; with the proviso that the total amount of the monomers (A) and (B) is lower than or equal to 20% by mole, and excluding the value 0 for the amount of the monomer (B).

2. Copolymers according to claim 1, wherein the pefluoroalkylvinylether is perfluoropropylvinylether.

3. Copolymers according to claim 1, wherein the fluorodioxol of formula (I) is present in an amount comprised between 0.5 and 9% by moles.

4. Copolymers according to claim 1, wherein the perfluorinated monomer (b) is present in amounts comprised between 0 and 10% by moles.

5. Copolymers according to claim 1, wherein the total amount of the monomers (a) and (b) is lower than or equal to 12% by moles.

6. Copolymers according to claim 1, wherein in the formula (I) of the monomer (a) $X_1$ and $X_2$ are both —F.

7. Copolymers according to claim 1, wherein in the formula (I) of monomer (a) $R_f$ is selected from —$CF_3$, —$CF_5$, and —$C_3F_7$.

8. Copolymers according to claim 1, having a melting viscosity such as to obtain Melt Flow Index (MFI) values, measured according to standard ASTM D 1238-52T, comprised between 0.5 and 50 g/10'.

9. Copolymers according to claim 8, wherein the Melt Flow Index (MFI) value is comprised between 1 and 30 g/10'.

* * * * *